United States Patent
Rousseau et al.

(10) Patent No.: US 9,255,231 B2
(45) Date of Patent: Feb. 9, 2016

(54) METHOD AND APPARATUS FOR FIXED BED GASIFICATION

(71) Applicant: COGEBIO, Irigny (FR)

(72) Inventors: Louis Rousseau, Rochetaillee sur Saone (FR); Etienne Lebas, Seyssuel (FR); Christian Bedrossian, Pont-de-Cheruy (FR); Bruno Da Silva, Saint Genis Laval (FR)

(73) Assignee: COGEBIO, Irigny (FR)

( * ) Notice: Subject to any disclaimer, the term of this patent is extended or adjusted under 35 U.S.C. 154(b) by 0 days.

(21) Appl. No.: 14/368,119

(22) PCT Filed: Dec. 27, 2012

(86) PCT No.: PCT/FR2012/053086
§ 371 (c)(1),
(2) Date: Sep. 30, 2014

(87) PCT Pub. No.: WO2013/098525
PCT Pub. Date: Jul. 4, 2013

(65) Prior Publication Data
US 2015/0137041 A1    May 21, 2015

(30) Foreign Application Priority Data
Dec. 29, 2011  (FR) ..................... 11 62516

(51) Int. Cl.
*C10J 3/66*  (2006.01)
*C10J 3/26*  (2006.01)
*C10J 3/30*  (2006.01)
*C10J 3/36*  (2006.01)
*C10J 3/32*  (2006.01)

(52) U.S. Cl.
CPC .... *C10J 3/26* (2013.01); *C10J 3/30* (2013.01); *C10J 3/32* (2013.01); *C10J 3/36* (2013.01); *C10J 2200/152* (2013.01); *C10J 2200/158* (2013.01); *C10J 2300/0916* (2013.01); *C10J 2300/0956* (2013.01)

(58) Field of Classification Search
CPC .................. C10J 3/26; C10J 3/66; C10J 3/30; C10J 3/36; C10J 3/32; C10J 2300/0916; C10J 2300/0956; C10J 2200/152; C10J 2200/158
See application file for complete search history.

(56) References Cited

FOREIGN PATENT DOCUMENTS

| DE | 10 2009 030542 A1 | 12/2010 |
|---|---|---|
| DE | 20 2010 013745 U1 | 12/2010 |
| DE | 10 2010 033646 A1 | 8/2011 |
| EP | 1 580 253 A1 | 9/2005 |
| NL | 8 200 417 A | 9/1983 |
| WO | 2008/068596 A2 | 6/2008 |
| WO | 2008/107727 A2 | 9/2008 |
| WO | 2009/020442 A1 | 2/2009 |
| WO | WO 2009020442 A1 * | 2/2009 |
| WO | 2009/093107 A1 | 7/2009 |

* cited by examiner

*Primary Examiner* — Stanley Silverman
*Assistant Examiner* — Syed Iqbal
(74) *Attorney, Agent, or Firm* — Jordan IP Law, LLC; Todd A. Vaughn

(57) ABSTRACT

A fixed bed gasification system to convert solid organic matter (also called biomass), into synthesis gas. This gas can be burned in an engine, turbine, oven or boiler, which makes it possible to valorize the thermal energy that it harbors.

20 Claims, 4 Drawing Sheets

METHOD AND APPARATUS FOR FIXED BED GASIFICATION

CROSS-REFERENCE TO RELATED APPLICATIONS

The present application is a National Stage application of PCT International Application No. PCT/FR2012/053086 (filed on Dec. 27, 2012), under 35 U.S.C. §371, which claims priority to French Patent Application No. A 11 62516 (filed on Dec. 29, 2011), which are each hereby incorporated by reference in their respective entireties.

TECHNICAL FIELD

Embodiments relate to the field of biomass gasification, and more particularly to a fixed bed gasification system used for converting solid organic matter (also called biomass), into synthesis gas. This gas can be burned, for example in an engine, turbine, oven or boiler, which makes it possible to valorize the thermal energy that it harbors. The invention relates in particular to a gasification system of average size, of a magnitude of a few hundred kW to a few MW.

BACKGROUND

Gasification of the biomass consists in breaking down in the presence of a reactive gas (oxygen for example) a solid, for example wood, in order to obtain a gaseous product. During this process, the biomass is subjected to the following four successive thermochemical phenomena: drying, pyrolysis, oxidation and reduction.

Drying: the humidity of the fuel is removed via evaporation. This operation is endothermic, it takes place at a temperature typically between 100° C. and 160° C.

Pyrolysis: combustible and non-combustible gases are released by the dry biomass starting at 250° C. These gases are comprised of non-condensable vapors (methane, hydrogen, carbon monoxide, carbon dioxide, etc.) and of condensable vapors (tars). The residue of this operation called coke is carbon that contains mineral matter.

Oxidation: this takes place in the presence of the reactive gas (air, water vapor, pure oxygen, hydrogen) which conditions the calorific value of the gas at the outlet of the gasifier. The optimizing of the oxidation area is essential in that a strong proportion of tars produced during pyrolysis is cracked therein. The use of air, as a reactive gas, is the most common. In this specific case, the oxidation or partial combustion is the phase that provides the heat required for the three phases of the gasification process.

Reduction: the coke reacts with the water vapor and the carbon dioxide, forming hydrogen and carbon monoxide, the main constituents of the combustible gas produced.

Different technologies have been developed in order to implement the gasification of the biomass on an industrial scale. The most widespread technologies are the fixed bed gasifiers and the mobile bed gasifiers. The latter are intended for high thermal power installations (greater than 10 MW) and require a finely ground fuel.

Fixed bed gasifiers are intended for lower power installations and can use rougher fuel (for example wood chips). Two major categories of fixed bed gasifiers can be distinguished by the relative direction of circulation of the biomass and of the air: counter-current or co-current. In a counter-current gasifier, the supply with biomass is carried out via the top of the reactor and the air is injected by the bottom of the unit through a grid. The coke undergoes partial combustion which provides the thermal energy required for the various steps of the process. The gas passes through the reduction and pyrolysis areas and cools down by drying the biomass. This type of gasifier produces a lot of tars that must be eliminated at the output of the gasifier in order to be able to use the synthesis gas produced.

In a co-current gasifier, the supply with biomass and with oxidizing agent is carried out in the same direction. The gas produced passes through the hot zone which makes it possible to crack the tars formed during the pyrolysis reaction. As a consequence the gas produced leaves the reactor at a high temperature, of a magnitude of 700° C. The tar content is therefore much less than in the case of the counter-current gasifier. On the other hand, the existing co-current gasifiers are limited in terms of maximum power, due to the fact that the injecting of oxidizing agent (air, oxygen, water vapor) is carried out at the periphery, which limits the penetration of the reactive gas (also called "gasification agent" here) in the bed, in particular on the reduction area. Such a gasifier is described for example in patent application WO 2009/020442 (Detes Maden Enerji Ve Cevre Teknoloji Sistemleri Limited Sirket).

Solutions have been proposed to resolve this problem. U.S. Pat. No. 594,540 (Kitson, 1897) describes a co-current cylindrical gasifier wherein the entry of the air is carried out via the top of the cylinder. The air inlet nozzle has the shape of a cone, and the air is conveyed directly into the bed of biomass.

Likewise, U.S. Pat. No. 4,306,506 (Energy Recovery Research Group) describes a co-current cylindrical gasifier comprising successively from top to bottom an upper drying area, then a distillation area (pyrolysis), then an oxidation area, and finally a reduction area. The air is introduced via a duct that opens into the "core" of the oxidation area and comprising a cone for deflecting that sends air to the top and towards the bottom of all of the oxidation area. Furthermore, air can also be sent into the bottom of the reduction area, with this air being above all intended to cool the reduction area. In this configuration, injecting air results in two disadvantages: on the one hand, the oxygen of the air reacts with the hydrogen of the synthesis gas produced, which decreases the calorific power of the synthesis gas, and on the other hand, the synthesis gas is diluted by the nitrogen present in the air.

U.S. Pat. No. 4,568,271 (Kernforschungsanlage Jülich) describes a gasifier for the gasification of liquid effluents that contain organic compounds. The liquids are introduced into a vertical cylindrical container via a duct located in the top of the gasifier. An incandescent bed containing materials rich in carbon is located in the bottom of the cylindrical container. Oxygen is introduced into the incandescent bed via a central duct placed in the bottom of the cylindrical container then by a cone comprising openings and located in the incandescent bed. The liquid effluents are vaporized and "cracked". This device is suitable only for treating liquid effluents.

German Patent Application DE 102010033646 (Pyrox GMBH) describes a co-current fixed bed gasifier comprising a "separated" oxidation chamber placed inside the body of the gasifier. This oxidation chamber comprises a tapered upper area with the wide portion of the cone located at the bottom, an oxidizing agent (air) inlet is provided in the upper portion of the oxidation chamber. The tapered upper area further comprises a double wall inside of which the pyrolysis gases produced in the pyrolysis area are conveyed, and introduced into the oxidation chamber. These pyrolysis gases pass through a grid located on the periphery of the oxidation chamber. The oxidation chamber described in German Patent application DE 102010033646 typically has a burner arrangement. This device is of complex construction, in addition the pyrolysis gases are highly loaded with tars, and the inlet grid risks becoming clogged quickly.

Patent application NL 8200417 (TAB BV) describes a co-current fixed bed gasifier able to treat a large variety of fuels. This gasifier comprises an air inlet in the top of the body of the gasifier, with this air being brought by a pipe in a chamber comprising a tapered upper portion with the wide portion of the cone located at the bottom. Due to the shape of the chamber, the diffusing of the air in the biomass is not optimal.

The co-current fixed bed gasifiers according to prior art are therefore limited in power. There exists a need for a co-current fixed bed biomass gasification device that makes it possible to lift the limitations of prior art in terms of maximum power, able to operate in particular at a maximum power greater than 500 kW, and which makes it possible to obtain a synthesis gas with a high output, minimum tar content, and a minimum carbon in the ash.

SUMMARY

The problems are resolved by a co-current fixed bed gasifier intended to convert the biomass into synthesis gas and ash with the aid of a gasification agent, said gasifier comprising a reactor body, said reactor body comprising an upper portion and a lower portion, into which gasifier the biomass is introduced via an inlet duct located in the top of the upper portion of the body of the gasifier, the synthesis gas is evacuated via a synthesis gas evacuation duct, and the ash is evacuated in the bottom portion of the lower portion of the reactor body through an ash evacuation duct, and said gasifier comprising, from top to bottom: a biomass pyrolysis area; a biomass oxidation area; a reduction area; a grid comprising a plurality of openings through which the ash passes to be evacuated; and means of introducing a gasification agent, such as air or oxygen, said means of introducing the gasification agent comprising a cone for diffusing the gasification located at the top of the oxidation area of the gasifier, or above said oxidation area, and means for injecting the gasification agent located in the oxidation area of the gasifier.

Advantageously, the gasifier comprises an annular area wherein the synthesis gas is collected before leaving the gasifier via said synthesis gas evacuation duct.

The cone for diffusing is located below said inlet duct of the biomass, embedded in the biomass during the operation of said gasifier. Advantageously, the cone for diffusing has an outer diameter d that is between 20% and 60%, and more preferably between 30% and 50%, of the value of the inner diameter D of the upper portion of the reactor body. The internal angle of the cone is advantageously between 60° and 120°, and more preferably entre 70° and 110°.

In an embodiment, the gasifier according to the invention further comprises a gasification agent inlet located above the grid but below the oxidation area.

Advantageously, the surface area of said annular area is three to ten times greater (preferably about four to six times greater, and even more preferably about five times greater) than the surface area of the openings made in the grid.

The gasifier according to the invention can be carried out in different sizes and with different thermal powers, but its operation is optimal when its thermal power is between 200 and 5000 kW, preferably between 500 and 2500 kW, and encore plus preferably between 600 and 2000 kW.

Another object of the invention is a biomass gasification method that uses a gasifier according to the invention, wherein biomass is introduced via said inlet duct, the gasification agent is introduced via said cone for diffusing and via said means for injecting located in the oxidation area of the gasifier, the synthesis gases are evacuated via said annular area and said synthesis gas evacuation duct, and the ash is evacuated through said grid and the ash evacuation duct.

In an advantageous embodiment of this method, said gasification agent is also injected via an inlet located above the grid but below the oxidation area.

DRAWINGS

FIG. 1 diagrammatically illustrates a longitudinal cross-section of a gasifier according to the invention. FIGS. 1, 2 and 4 show, FIG. 3 shows a view of the top as a horizontal cross-section according to the plane A-A.

FIG. 2 diagrammatically illustrates a longitudinal cross-section of a gasifier according to the invention.

FIG. 1 diagrammatically illustrates a top view of a horizontal cross-section of a gasifier according to the invention, according to the plane A-A of FIG. 1.

FIG. 4 diagrammatically illustrates a longitudinal cross-section of a gasifier according to the invention.

DESCRIPTION

Figure 1:
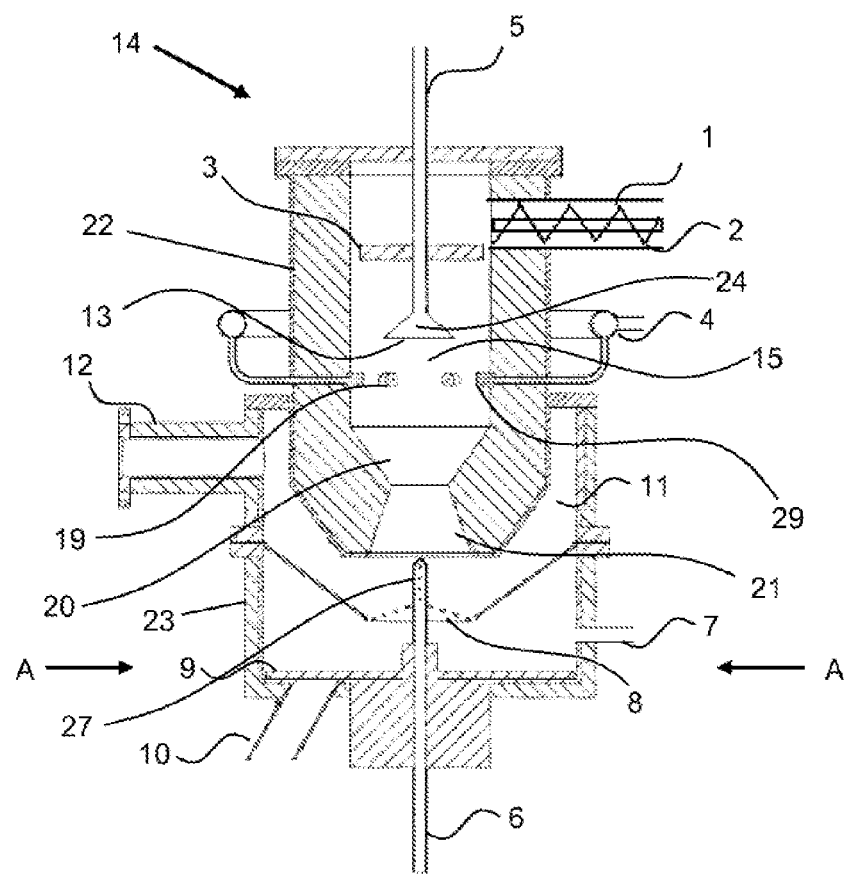
Figure 2:
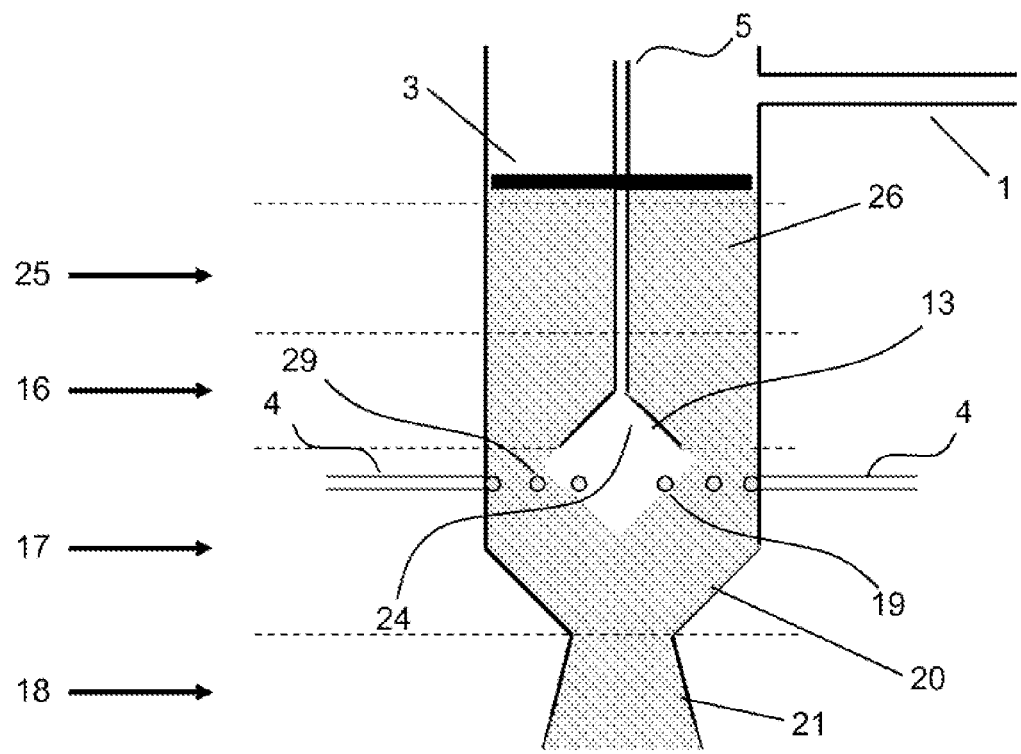
Figure 3:
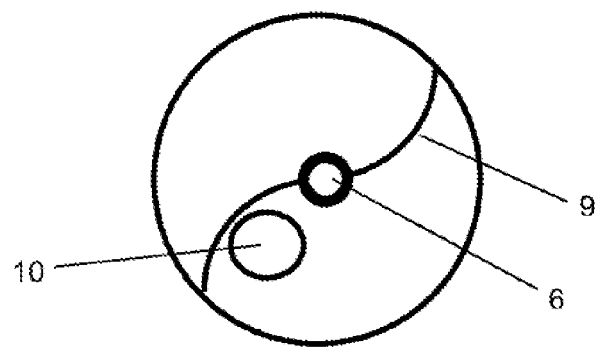
Figure 4:
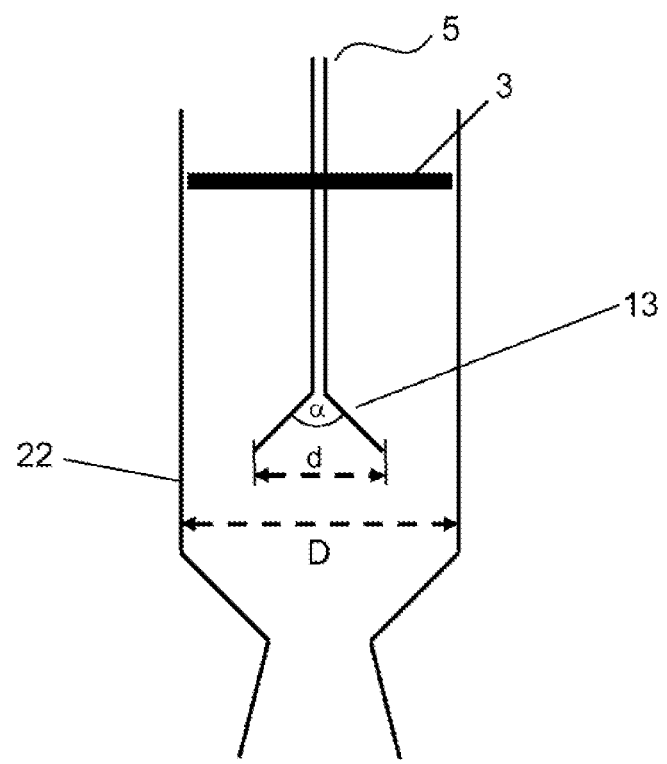

FIGS. 1 to 4 diagrammatically show different aspects of a gasifier according to the invention. FIGS. 1, 2 and 4 show a longitudinal cross-section, FIG. 3 shows a view of the top as a horizontal cross-section according to the plane A-A.

Figure 5A:
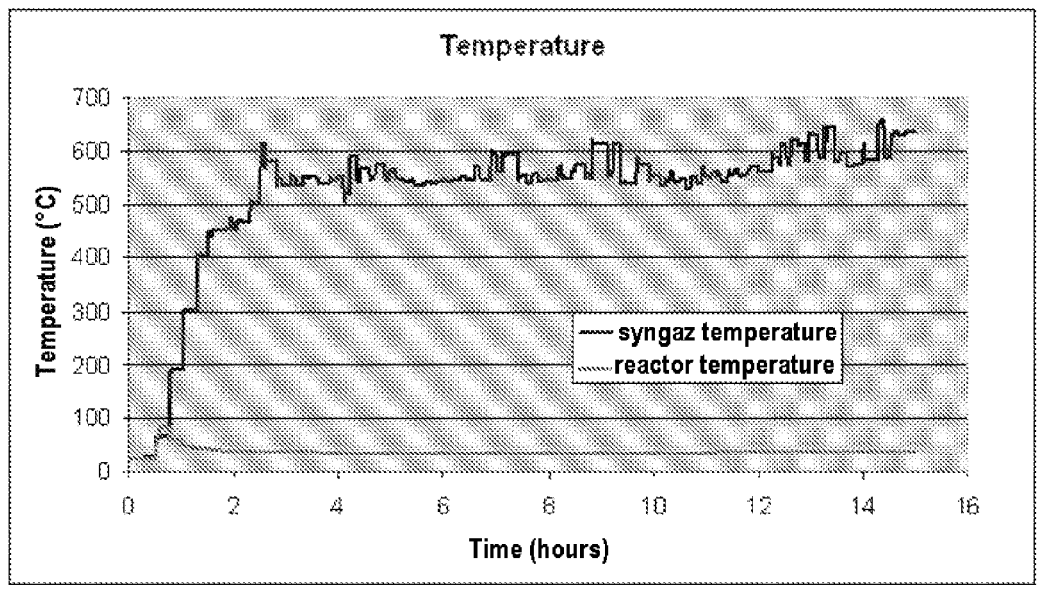
FIG. 5a illustrates a variation in the temperature of the synthesis gas at the output of the gasifier, and a variation of the temperature of the gas in a top portion of the reactor (light curve).
Figure 5B:
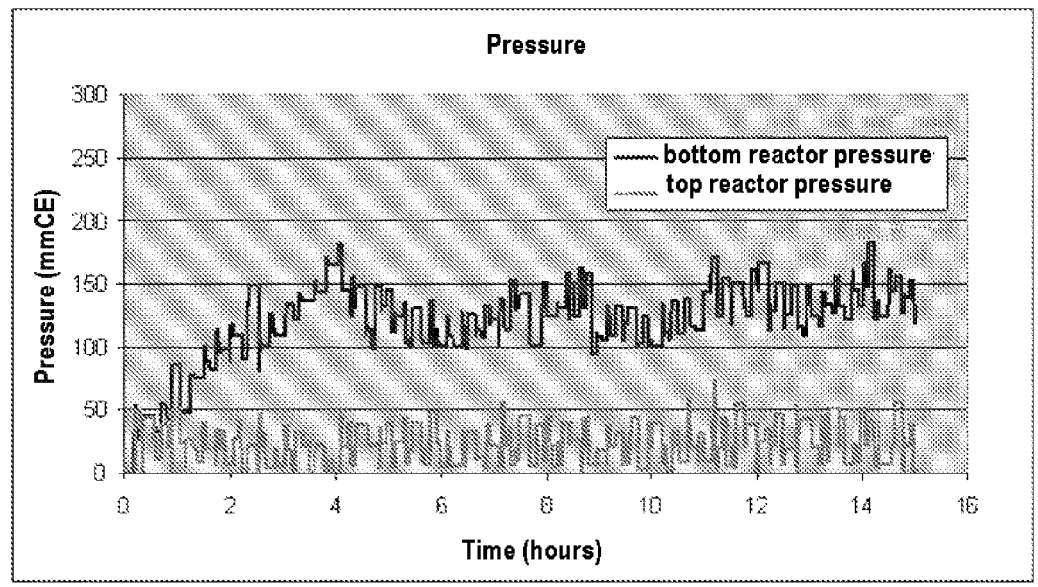
FIG. 5b illustrates a variation of the pressure at the top of the gasifier, and the variation of the pressure at the bottom of the gasifier.

FIG. 5a shows the variation in the temperature of the synthesis gas at the output of the gasifier (dark curve), and the variation of the temperature of the gas in the top portion of the reactor (light curve). FIG. 5b shows the variation of the pressure at the top of the gasifier (light curve), and the variation of the pressure at the bottom of the gasifier (dark curve).

The gasifier 14 (also called more generally reactor) according to the invention has a generally cylindrical-shaped reactor body, said body having an upper portion 22 and a lower portion 23. In an embodiment, the diameter of the lower portion 23 is larger than that of the upper portion 22 due to the presence of an annular area 11 through which the synthesis gas is evacuated.

According to the invention illustrated in FIGS. 1 and 2, the biomass 26 is introduced into the gasifier 14 via the inlet duct 1, typically by means of an endless screw 2. "Biomass" means solid organic matter, such as wood waste in various forms (chips, granulates, shreds, etc.), agricultural by-products (hay for example), dry residues (sludge) from treatment plants, and any other organic matter able to be treated in the conditions for which the gasifier 14 is designed. A rotating arm 3 makes it possible to equalize the biomass over the available surface.

FIG. 2 is a simplified view of the reactor 14 of FIG. 1 and diagrammatically indicates the approximate positions of the three reaction areas, namely the pyrolysis area 16, the oxidation area 17 and the reduction area 18, and the drying area 25. In the reactor 14 according to the invention, the oxidation area 17 is located approximately at the height of the reactive gas inlet 4, the pyrolysis area 16 is located higher, above the air diffuser cone 13, and the reduction area 18 lower, above the reactive gas lower inlet (which is optional) 6. The ash passes through a grid 8 located in the lower portion 23 of the reactor body, and accumulates below the said grid 8. It is periodically or continuously eliminated by a rotating arm 9 (typically a double arm) through an ash evacuation duct 10, such as is shown diagrammatically in FIG. 3.

The main gasification agent (reactive gas) inlet 4 is located at mid-height of the bed 15. It is comprised of a set of ducts or pipes that are terminated with means for injecting 19, 29, which are typically injection buses, distributed over the periphery of the body 22 of the reactor 14 and supplied by the ducts 4.

In the gasifier 14 according to the invention another reactive gas inlet is provided in the upper portion of the bed 15, by the upper duct 5, terminating by a cone for diffusing reactive gas 13. The cone for diffusing 13 allows for a better supply with reactive gas of the oxidation area 17 and an increase in the output of the device.

Indeed, the inventors realized that in order to lift the limitation in power of a co-current fixed bed gasifier, it is necessary to allow for a supply in reactive gas of the entire oxidation area. More particularly, the inventors observed that the peripheral air injection nozzles are no longer sufficient when the thermal power exceeds about 500 kW. Indeed, the limited penetration depth of the reactive gas in the biomass limits the power that can be obtained, knowing that the maximum thermal power is proportional to the section of the reactor. Starting from a certain diameter D of the reactor, which corresponds to a power of about 500 kW, the injection of reactive gas into the oxidation area therefore has to be improved; this additional injection is also beneficial for smaller reactors.

This problem is resolved by the cone 13 fastened to the central portion of the gasifier, above the oxidation area, which allows for the supplying with reactive gas of the core of the oxidation area. This cone 13 is supplied with reactive gas by a pipe 5 placed in the axis of the gasifier. This device makes it possible to supply with reactive gas optimally the center of the oxidation area of the gasifier, and to achieve thermal power levels reaching 5 MW with air as reactive gas.

The diffuser cone 13 is located below the rotating arm 3 that equalizes the level of the biomass, it is embedded in the biomass 26. During the operation of the reactor 14, in the space 24 inside the cone 13 a space devoid of solids is created delimited at the top by the cone 13 and at the bottom by the slope angle formed by the biomass 26.

Other advantages have appeared, also linked to the presence of this cone 13. The cone 13 defines two very separate portions in the gasifier 14: an upper portion for drying 25 and pyrolysis 16 of the biomass 26 and a lower portion for oxidation 17 and reducing 18 the coke. Its location is defined in such a way as to optimize the residence time of the solid in each of these portions. This makes it possible to operate in a sequential manner and to maximize the conversion of the pyrolysis tars. Indeed, in a conventional reactor, the tars are emitted in the pyrolysis area and cracked in the oxidation area. In the reactor according to the invention, a portion of the tars is oxidized in the cone 13. The biomass in the course of pyrolysis runs along the wall of the cone 13. The pyrolysis gas fills in the area 24. Inside the cone 13, which does not contain any biomass, there is a homogeneous oxidation of the tars. Homogeneous oxidation here means an oxidation in the gas phase. This allows for a drastic decrease in the concentration in tars of the gas produced. In a co-current fixed bed gasifier of a known type, the concentration in tars is greater than 500 mg/Nm3 of gas produced, while with the device according to the invention, it can fall to a value less than 50 mg/Nm3, and even less than 35 mg/Nm3.

The homogeneous oxidation area 24 located inside the cone 13 is not occupied by the biomass. It can therefore be used to start the gasifier by carrying out a fossil fuel combustion (natural gas, propane or other) introduced by a device (not shown in the figures) inserted into the pipe 5. The zone 24 also makes it possible during the stabilized operation of the gasifier 14 to directly oxidize with air a portion of the pyrolysis gas and the tars generated in the upper portion 16.

The cone 13 is furthermore a heat exchange device making it possible to provide a portion of the energy required for the drying and for the pyrolysis of the biomass 26. Indeed, the oxidation reaction is exothermic, while the drying and the pyrolysis require a supply of energy. However, in a conventional gasifier the energy produced by the oxidation cannot be used for the drying and/or pyrolysis because the bed of biomass is a poor heat conductor. The cone 13 is generally comprised of steel, which is a good heat conductor, which makes it possible to recover the energy produced by the oxidation and to transfer it at least partially to the biomass located in the pyrolysis 16 and drying 25 areas.

In an advantageous embodiment, the cone 13 has advantageously an outer diameter d that is between 20% and 60%, and more preferably between 30% and 50%, of the value of the inner diameter D of the upper portion 22 of the reactor body; these parameters are shown in FIG. 4. The internal angle $\alpha$ of the cone 13 is advantageously between 60° and 120°, more preferably between 70° and 110°. These parameters lead to an optimal shape of the oxidation area 17. If the cone is more flared, i.e. if its internal angle $\alpha$ is greater than 120°, on the one hand the flow of the biomass above the cone is difficult, on the other hand the recirculation of the gases inside the cone is not enough to allow for good oxidation of the pyrolysis gases. If the cone is less flared, i.e. if its internal angle $\alpha$ is less than 60°, it does not form an sufficient obstacle to the flow of the biomass and therefore does not make it possible to define a pyrolysis area above the cone, in addition it does not allow for the recirculation of the pyrolysis gases inside the cone.

The simultaneous presence in the oxidation area 17 of the peripheral air inlets 4, 19, 29 and of the central air inlet constituted by the pipe and the cone 5, 13 allow for a supplying with homogeneous air of the oxidation area 17, which makes it possible to increase the output of the gasifier 14. The presence of the cone 13 furthermore provides an additional oxidation area for the tars in a specific area located under the cone.

In a co-current reactor according to prior art, the concentration in particles of the gas produced is stronger than in a counter-current reactor. Indeed, the gas passes through the coke in the reduction phase while its granulometry becomes very fine. The gas this drives a portion of the particles of coke and of ash at the outlet of the reactor. In the device of the invention, the problem becomes critical due to the increase in the power supplied by the presence of the cone. Because of this, in order to minimize the particle content of the synthesis gas, it is important to limit the speed of the synthesis gas when it leaves the bed of coke in order to reduce the driving of the particles.

Existing devices provide an exit of gases via the lower grid of the gasifier, they do not make it possible to reduce the extraction speed of the gas, because the size of the grid, and its openings, are necessarily limited in order to limit the de-ashing.

In a particular embodiment of the device 14 of this invention, the synthesis gas exits the reactor 14 via the tapered annular area 11 located above the grid 8. The surface area of this tapered annular area 11 (defined by the surface of the "slope" of the biomass above the grid 8) is of a magnitude of three to ten times higher (preferably about four to six times higher, and even more preferably about five times higher) than the surface area of the opening made in the grid 8. This decreases by the same factor the extraction speed of the synthesis gases in relation to their extraction through the grid 8. As a consequence, the device 14 of this invention allows for an evacuation of the synthesis gas at a low speed in such a way as to limit the driving of particles. Indeed, because the surface area of the annular evacuation area 11 is much higher than the openings made in the grid, the extraction speed of the gases is much less to what it would be via an extraction through the grid 8. The driving of particles of coke and of ash is therefore very limited.

Other advantages linked to the extraction of the gases via the annular area 11 have also appeared. The loss of load in the bed of solids was sharply reduced. Indeed, the finest granulometry of the bed of solids 15 is located in the immediate vicinity of the grid 8, with the conversion of the coke into synthesis gas producing increasingly smaller grains. This means that the porosity of the bed 15 is lower above the grid than in the upper portion of the bed of solids.

When the extraction of the gas is carried out under the grid, the gas has to pass through this very fine solid in order to pass through the grid, the loss of load is very substantial which generally entails installing an high-power extractor on the synthesis gas line which increases the electrical consumption linked to the extraction of the gases. In addition, it is also difficult to push the conversion of the coke very far because this results in a very fine granulometry. The carbon content of the ash therefore remains substantial which limits the rate of conversion of the biomass into synthesis gas. However, in the gasifier 14 according to the invention, the extraction of the gases is carried out above the grid 8, the gases therefore do not have to pass through the layer of fine particles. The granulometry of the coke can be very fine on the grid 8 without increasing the loss of load on the synthesis gas line. This makes it possible to use an extractor of less power and to limit the electrical consumption of this item.

Furthermore, in another particular embodiment of the gasifier 14 according to the invention, another reactive gas inlet is provided under the grid 8 by the duct 7 which can be an annular duct. In this embodiment, it is possible to inject reactive gas under the grid 8 in order to maximize the conversion of the coke and to limit the carbon content of the ash. This results in a gain in the output of the gasifier 14.

In a particular and advantageous embodiment, a reactive gas inlet by means of a central tube 6 is provided above the grid 8. The injection of reactive gas above the grid 8 makes it possible to extend the hot area of the coke towards the bottom of the reactor 14. As a consequence, the conversion of the coke is maximized, and the output of the gasifier 14 is further improved. An embodiment that has both a reactive gas 7 inlet under the grid 8 and an air inlet 6 exiting in the injection holes 27 located above the grid 8 is shown in FIG. 1.

Furthermore, the additional reactive gas inlets 6, 7 allow for a significant reduction in the carbon content of the ash, and therefore an increase in the overall output of the gasifier 14.

The synthesis gas produced by the gasifier 14 according to the invention can be burned or used as raw materials in chemical reactions, such as Fischer-Tropsch synthesis.

Typically, the outer wall of the gasifier 14 according to the invention can be made of steel, and the inner wall, which is in contact with the biomass, of refractory concrete. Tests have been conducted on a reactor according to FIG. 1 with an inner diameter D of 740 mm and a maximum thermal power of a magnitude of 300 kW. The temperatures in the various areas of the reactor were determined in different operating conditions. Advantageously, in the drying area 25, the temperature is of a magnitude of 90 to 120° C., in the pyrolysis area 16 of a magnitude of 250 to 500° C., in the oxidation area 17 of a magnitude of 800 to 1300° C., and in the reduction area 18 of a magnitude of 1100 to 700° C.

In a particular embodiment, the cone 13 has an internal angle α of about 80°.

The temperature of the synthesis gas and the temperature of the gasifier were measured during the first 15 hours of operation. The pressure was also measured at the top and at the bottom of the gasifier. The curves are shown in FIGS. 5a and 5b. The "syngaz temperature" is the temperature of the gas produced at the outlet of the gasifier. The "reactor temperature" is the temperature of the gas in the top portion of the gasifier. The "bottom reactor pressure" is the pressure measured at the bottom of the gasifier. The "top reactor pressure" is the pressure measured at the top of the gasifier. The difference between these two values indicates the loss of load of the bed of solids that the gas passes through. The pressures are identical in mmCE on the curves. These are in fact negative pressures because the reactor is in a slight vacuum.

In order to characterize the chemical composition of the synthesis gas obtained, two gas samples were taken successively (referenced as SCA1 and SCA2) in good operating conditions of the reactor 14. The analysis of the two bottles of gas was carried out via gas phase microchromatography. The results are shown hereinbelow; the percentages are volume values.

|      | $H_2$  | $O_2$ | $N_2$  | $CH_4$ | CO     | $CO_2$ |
|------|--------|-------|--------|--------|--------|--------|
| SCA1 | 14.18% | 0.89% | 46.61% | 1.77%  | 21.03% | 7.28%  |
| SCA2 | 14.00% | 0.69% | 46.03% | 2.03%  | 20.89% | 7.85%  |

| LIST OF REFERENCE NUMERALS | |
|---|---|
| 1 | Inlet duct for biomass |
| 2 | Endless screw |
| 3 | Rotating arm |
| 4 | Reactive gas inlet duct |
| 5 | Reactive gas upper inlet duct |
| 6 | Reactive gas lower inlet duct |
| 7 | Reactive gas annular inlet duct |
| 8 | Grid |
| 9 | Rotating arm |
| 10 | Ash evacuation duct |
| 11 | Annular area |
| 12 | Synthesis gas evacuation duct |
| 13 | Reactive gas/Cone diffuser |
| 14 | Gasifier (reactor) |
| 15 | Bed |
| 16 | Pyrolysis area |
| 17 | Oxidation area |
| 18 | Reduction area |
| 19, 29 | Reactive gas injection nozzle |
| 20 | Funnel area expanding upwards |
| 21 | Funnel area expanding downwards |
| 22 | Reactor body (upper portion) |
| 23 | Reactor body (lower portion) |
| 24 | Homogeneous oxidation area |
| 25 | Drying area |
| 26 | Biomass |
| 27 | Injection holes |

What is claimed is:

1. A co-current fixed bed gasifier to convert biomass into synthesis gas and ash with aid of a gasification agent, the co-current fixed bed gasifier comprising:

a reactor body having an upper portion with an inlet duct into which the biomass is introduced, and a lower portion with a synthesis gas evacuation duct through which the synthesis gas is evacuated and an ash evacuation duct through which the ash is evacuated;

a first region for pyrolysis of the biomass;

a second region for oxidation of the biomass;

a third region for reduction;

a grid having a plurality of openings through which the ash passes to be evacuated; and a device to introduce a gasification agent into the reactor body, the device including a cone to diffuse the gasification agent and which is located at an upper area of the second region, and an injector to inject the gasification agent.

2. The co-current fixed bed gasifier of claim 1, wherein the upper portion defines an annular zone which collects the synthesis gas before exiting through the synthesis gas evacuation duct.

3. The co-current fixed bed gasifier of claim 1, wherein the cone is located spatially below the inlet duct, and, during operation, is embedded in the biomass.

4. The co-current fixed bed gasifier of claim 1, wherein the cone has an outer diameter that is between 30% and 50% of an inner diameter of the upper portion of the reactor body.

5. The co-current fixed bed gasifier of claim 1, wherein an internal angle of the cone is between 70° and 110°.

6. The co-current fixed bed gasifier of claim 1, wherein during operation, the cone defines a homogeneous oxidation area.

7. The co-current fixed bed gasifier of claim 1, wherein the cone defines two separate portions: an upper cone portion for drying of the biomass and which includes the first region, and a lower cone portion which includes the second region and the third region.

8. The co-current fixed bed gasifier of claim 1, wherein the cone comprises a heat exchanger to supply a portion of energy required for the drying and pyrolysis of the biomass.

9. The co-current fixed bed gasifier of claim 1, further comprising a gasification agent inlet located spatially above the grid and spatially below the second region.

10. The co-current fixed bed gasifier of claim 2, wherein the surface area of the annular zone is about five times greater than the surface area of the openings in the grid.

11. The co-current fixed bed gasifier of claim 2, wherein a thermal output of the co-current fixed bed gasifier is between 600 and 2000 kW.

12. A gasifier, comprising:

a reactor body having:

an upper reactor body portion with an inlet duct into which a biomass is introduced, a first region for pyrolysis of the biomass, a second region spatially below the first region for oxidation of the biomass, and a third region for reduction spatially below the second region; and a lower reactor body portion with a first evacuation duct through which a synthesis gas is evacuated and a second evacuation duct through which ash is evacuated;

a grid having a plurality of openings through which the ash passes prior to being evacuated; and a device to introduce a gasification agent into the reactor body, the device including a cone to diffuse the gasification agent and which is located at an upper area of the second region, and an injector to inject the gasification agent.

13. The gasifier of claim 12, wherein the upper portion defines an annular zone which collects the synthesis gas before exiting through the first evacuation duct.

14. The gasifier of claim 12, wherein the cone is located spatially below the inlet duct, and, during operation, is embedded in the biomass.

15. The gasifier of claim 12, wherein the cone has an outer diameter that is between 30% and 50% of an inner diameter of the upper reactor body portion.

16. The gasifier of claim 12, wherein the cone defines an upper cone portion for drying of the biomass and which includes the first region, and a lower cone portion which includes the second region and the third region.

17. The gasifier of claim 12, wherein the cone comprises a heat exchanger to supply a portion of energy required for the drying and pyrolysis of the biomass.

18. The gasifier of claim 12, further comprising a gasification agent inlet located spatially above the grid and spatially below the second region.

19. A method for biomass gasification, comprising:

providing a gasifier having:

a reactor body with an upper reactor body portion with an inlet duct, a first region for pyrolysis of the biomass, a second region spatially below the first region for oxidation of the biomass, and a third region for reduction spatially below the second region; and a lower reactor body portion with a first evacuation duct and a second evacuation duct;

a grid having a plurality of openings through which ash passes prior to being evacuated; and a device to introduce a gasification agent into the reactor body, the device including a cone to diffuse the gasification agent and which is located at an upper area of the second region, and an injector to inject the gasification agent;

introducing the biomass via the inlet duct;

introducing the gasification agent via the device;

evacuating the synthesis gases via the first evacuation duct; and evacuating the ash through the grid and the second evacuation duct.

20. The method of claim 19, further comprising injecting the gasification via an inlet located above the grid and below the first region.

* * * * *